Figure 1:
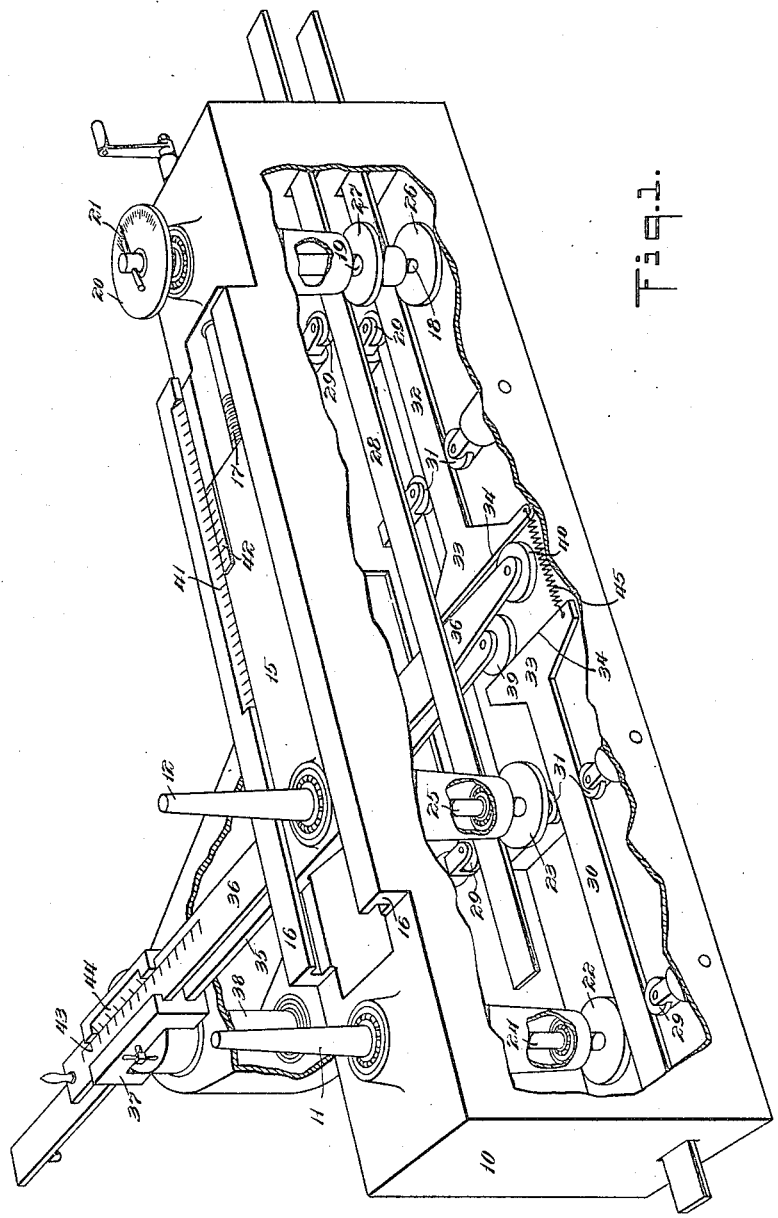

Feb. 6, 1923.

J. LAESSKER

APPARATUS FOR TESTING GEAR WHEELS

Filed Aug. 2, 1921

1,444,470

2 sheets-sheet 1

INVENTOR
*Jean Laessker*
BY
ATTORNEY

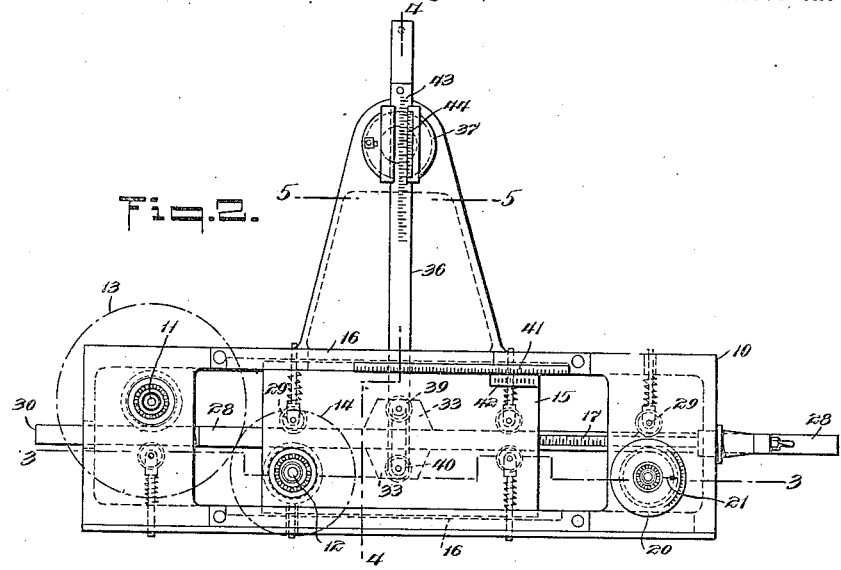

Patented Feb. 6, 1923.

1,444,470

UNITED STATES PATENT OFFICE.

JEAN LAESSKER, OF ARBON, SWITZERLAND, ASSIGNOR TO SOCIETE ANONYME ADOLPHE SAURER, OF ARBON, SWITZERLAND, A CORPORATION OF THE SWISS CONFEDERACY.

APPARATUS FOR TESTING GEAR WHEELS.

Application filed August 2, 1921. Serial No. 489,171.

*To all whom it may concern:*

Be it known that I, JEAN LAESSKER, a subject to the King of Sweden, and resident of Arbon, Switzerland, have invented certain new and useful Improvements in Apparatus for Testing Gear Wheels, of which the following is a specification.

This invention is an improvement in apparatus for testing toothed gear wheels to ascertain possible inaccuracy in the shape or fault in the design of the teeth thereof, and relates more particularly to that type of apparatus in which a pair of gears to be tested, one of which may be a master gear, are rotated while in proper mesh, and variations in the rate of rotation of one in respect to the other are indicated or recorded. A device of this general type is described and claimed in the Hippolyt Saurer Patent No. 1,263,472, issued April 13th, 1918, and reissued December 21st, 1920, as No. 15,013.

In the specific form there illustrated, a pair of friction disks are employed which correspond in diameters to the pitch diameters of the two gears and the substitution of a gear of different pitch diameter requires a corresponding substitution of its respective disk.

The main objects of my invention are to avoid the necessity of this substitution or interchange of parts each time a gear of different diameter is to be tested, and to permit of the testing of gears of different diameters by an adjustment rather than a substitution of parts.

As in said patent, I preferably employ a pair of rotating members mounted coaxially, one being driven from the axis of one gear and the other from the axis of the other gear, and indicated or recorded variations in the relative rates of rotation of these members result from, and correspond to, the particular form or shape of the teeth of the gear.

In carrying out my invention, I employ motion transmitting mechanism between one of said gears and its corresponding rotating member which is capable of adjustment so that the substitution of a larger or smaller gear may be compensated for in the transmission of the motion resulting from the rotation of that gear. In other words, the rotating of the two members at approximately the same rate may be accomplished by adjustment of the motion transmitting mechanism to an extent corresponding to the difference in pitch diameters of the gears.

In its preferred embodiment, the motion transmitting mechanism from one gear includes a lever member, the power or leverage ratio of which may be adjusted in accordance with the diameters of the gear wheel. A change in the ratio of the diameters of the two gears may thus be compensated for by adjustment of the transmission ratio of the lever member.

A further object of my invention is the provision of adjustable lever mechanism which will operate at various different power transmitting ratios and without lost motion or binding or jamming of the parts. I may advantageously accomplish this result by a novel form of double lever having longitudinally adjustable arms separately connected by coupling rods with friction wheels or disks, one rotated by one gear wheel and the other serving to rotate the corresponding rotary member of the indicating or recording devices. By the simple expedient of longitudinally adjusting the point of engagement of said rods with said lever arms radially in respect to the fulcrum or axis of movement of the lever arms, the transmission ratio from one rod to the other may be quickly and easily adjusted at will. The adjustment of the point of engagement in respect to the fulcrum may be easily accomplished by a bodily adjustment of one or both lever arms endwise in respect to a carrier at, or constituting, the fulcrum. By the use of proper indicating scales, the proper adjustment of the lever arms may be quickly made in accordance with the known gear ratio of the pair of meshing gears being employed or tested. The device is rendered particularly compact and the source of error in the transmission of motion to the indicating apparatus eliminated by mounting the two arms of the double lever one above the other in a rotatable guide having means for rapidly securing them in adjusted position with the bearing points engaging with the free ends of the sections of the coupling rods which serve as guides.

As a further important feature of my construction, the indicating mechanism is so positioned that it does not in any way interfere with the free interchange of gears to be tested. This is secured by mounting the indicating mechanism at the desired distance from the gear carrying spindles, and connecting the rotating parts of the indicating mechanism to the rotating gear supports, by means of longitudinally moving coupling members.

In the accompanying drawings there is illustrated a device constructed in accordance with my invention, alternative forms of some of the parts being illustrated. In these drawings, Fig. 1 is a perspective view of a device, portions thereof being broken away.

Fig. 2 is a plan view of a slightly modified form,

Figs. 3, 4, and 5 are sections on the lines 3—3, 4—4, and 5—5 respectively, of Fig. 2, and Fig. 6 is a perspective view of a slightly modified form of one detail.

The operating parts of my improved device are mounted on a suitable frame which is preferably in the form of a casing 10 which will conceal and protect the parts. This casing or frame carries a pair of spindles 11 and 12, upon which the two gears 13 and 14 to be tested are mounted. One of these gears, for instance the gear 14, may be a master gear with which various different gears may be mounted in meshing relationship for test purposes. The two spindles are adjustable toward and from each other to accommodate gears of different diameters. Any suitable means may be employed for accomplishing this, as for instance the spindle 12 may be mounted on a slide or carriage 15, movable in guides 16 on the body of the casing. The adjustment of the slide or carriage may be accomplished by means of a screw rod 17 mounted in one end of the casing and having threaded engagement with a lug rigid or integral with the slide 15. This screw rod may be operated in any suitable manner, as for instance by a crank or hand wheel.

The two spindles are mounted adjacent to one end of the casing and the indicating mechanism may be mounted adjacent to the opposite end. This indicating mechanism includes a pair of coaxial rotatable members including a shaft 18 and a sleeve 19. One of these is driven from the spindle 11 and the other from the spindle 12, and the driving or motion transmitting mechanism is such that any irregularity, inaccuracy or defect in the shape or contour of the teeth of either or both gears will cause a variation in the relative rates of rotation of the members 18 and 19. I do not wish to be limited to any specific form of indicating means. The specific means employed will vary depending upon whether it is desired to merely give an indication, or whether it is desired to make a record of the result of the test.

The two coaxial relatively rotatable members may be coupled to such an indicating and recording mechanism as that shown in the Saurer patent above referred to, or may be coupled to a simpler form of mechanism which indicates but does not record.

Merely for purposes of illustration I have shown the sleeve 19 provided with a dial 20 having suitable graduations or indications thereon, and the shaft 18 is provided with a pointer 21. The rotation of the two members 18 and 19 at the same uniform rate will hold the pointer in a constant position on the scale of the dial 20, but any variation in the rate of rotation will cause a relative movement of the pointer and scale.

One of the important features of my invention involves the means for transmitting motion from the gear spindles to the coaxial indicator members and to permit of an adjustment of the transmission ratio at will. The motion transmitting mechanism as illustrated, includes a pair of friction disks 22 and 23 mounted on the shafts 24 and 25 which carry the spindles 11 and 12, and a second pair of friction disks 26 and 27 mounted on the shaft 18 and sleeve 19 of the indicating mechanism. Separate means are provided for transmitting motion from the disk 22 to the disk 26 and from the disk 23 to the disk 27. The means for adjusting the transmission ratio may be employed in either or both of these motion transmitting connections and may be used singly or in series in either or both. I have illustrated the motion ratio adjusting mechanism employed in only one of the motion transmitting connections. Where no adjustment is employed, a rod 28 may be mounted so as to act in frictional engagement with the peripheries of the two disks as for instance the disks 23 and 27. This rod may be held in frictional engagement with the two disks by pressure idler rollers 29 held against the rod 28 by suitable springs. It is of course essential that the peripheries of the disks be ground true, and that the faces of the rods be also accurately formed. It will of course be evident that any other suitable means might be employed for transmitting the motion from the disk 23 to the disk 27.

Where it is merely desired to separate the indicating means from the vicinity of the gears being tested the same means above described may be employed for transmitting motion from the disk 22 to the disk 26, and without adjustment of the transmission ratio.

For adjusting the transmission ratio, I have shown the disks 22 and 26 connected by a two part connecting rod with means for varying the relative movement of the two sections. As shown, the rod 30 is held in proper frictional engagement with the disk 22 by means of a pressure idler 29, and is guided between guiding rollers 31. A similar rod 32 is held in frictional engagement with the disk 26 by means of the pressure idler 29, and is likewise guided by a pair of guide rollers 31. The rods 30 and 32 have opposed ends 33 presenting transverse guiding faces 34. The adjusting mechanism is illustrated as including a pair of superposed lever arms 35 and 36 mounted in a guide block 37 carried by a pivot block 38 mounted in the frame or casing of the apparatus, and at some distance to one side of the general position of the rods above referred to. The lever 35 has a roller 39 engaging with the transverse face of the rod 30, and the lever arm 36 has a roller 40 engaging with the transverse face of the rod 32. The two lever arms are spaced a short distance apart, vertically, and therefore the two rods 30 and 32 are likewise spaced for proper engagement with the rollers. With the two rollers at the same distance from the fulcrum, namely the axis of the pivot block 38, any movement of one of the rods 30—32 will result in a corresponding movement of the other. By adjusting one roller nearer to or farther from the lever fulcrum, there will be a corresponding variation in the relative endwise movement of the two rod sections. I do not wish to be limited to any particular means for varying the relative position of the rollers in respect to the lever fulcrum, nor do I wish to be restricted to the use of rollers as against other forms of bearing or contact means reasonably free from friction losses. It is more convenient to secure the adjustment by the bodily endwise movement of one or both of the lever arms than it is by the adjustment of the rollers or bearing members along the levers. As illustrated the upper lever arm 36 is slidable through the guide block 37 and may be held in position by a suitable set screw. To facilitate the adjustment of the apparatus, suitable scales are preferably provided. As shown, the casing 10 and the slide or carriage 15 have coacting scales 41 and 42, by means of which the distance between the axes of the spindles 11 and 12 or the ratio of the diameter of a gear to be tested to the diameter of a master gear, may be readily ascertained when the gears are in proper mesh. The upper lever arm 36 and the guide block 37 may have similar scales 43 and 44, indicating the longitudinal adjustment of the lever 36, and these scales may be calibrated to read in gear diameter ratio so that when the two gears are brought into proper mesh, the lever arm 36 may be adjusted endwise until there is the same reading on the scale 43 as there is on the scale 41. With this calibration and adjustment, the rotation of the two gears will give substantially the same rate of rotation to the pointer 21 and dial 20, but inaccuracies in the tooth formation will cause the relative back and forth movement of the pointer over the scale.

With my improved construction, it is not necessary to remove or substitute any parts of the apparatus when it is desired to test gears of different diameters. It is merely necessary to make the proper adjustment of the motion transmitting mechanism. It will of course be evident that for comparatively small variation in gear sizes the longitudinal adjustment of one lever arm is sufficient, but for wider variation both lever arms may be adjusted one in one direction and the other in the other direction. Furthermore, there may be provided a series of master gears of different sizes, and thus the apparatus need be adjusted only to take care of variations in gear ratio between those variations accomplished by substituting different master gears. Even with the substitution of master gears, it is not necessary to change the friction disks or other operating parts within the casing.

I do not wish to be limited to the specific construction illustrated, as various changes may be made. The two rod sections 30 and 32 may be held against the rollers 39 and 40 in various different ways, as for instance by means of a spring 45 as shown in Fig. 1, or by forming channels 46 engaging with opposite sides of the rollers, as indicated in Fig. 6. Although it is preferable to have the plane of the axes of the spindles parallel to the direction of movement of the slide or carriage 15, as indicated in Fig. 1, so that the scales may show the exact change in position of one spindle in substituting a gear of different diameter the plane of the axes may be at an angle to the direction of movement of the slide or carriage 15, as indicated in Fig. 2. It is merely necessary that the opposite directional rotation of the disks 22 and 23 transmit unidirectional rotation of the disks 26 and 27.

It is thought that the operation of the device will be sufficiently clear from the foregoing description, but may be briefly stated as follows:

A master gear 14 is placed on the spindle 12, and a gear 13 to be tested is placed on the spindle 11. One of these gears, for instance the master gear, is positively rotated and the motion is transmitted through the parts 25, 23, 28, 27, and 19 to the dial 20. With the upper lever arm 36 adjusted endwise to the proper position the rotation of the gear 13 will be transmitted through the parts 24, 22, 30, 39, 35, 36, 40, 32, 26, and 18 to the pointer. If the adjustment of the lever arm has been properly made and the gears are accurately formed, the pointer and dial will rotate together. If the gear is defective, or the teeth are inaccurate, there will be an oscillation or variation of the pointer upon the scale during their rotation.

If the adjustment of the lever arm has not been properly made, the pointer will rotate faster or slower than the dial. This may be readily corrected by readjustment of the lever arm. If the friction disks 22 and 23 be of the same diameter and the disks 26 and 27 be of the same diameter, and the two gears be of the same diameter, then the two rollers 39 and 40 can be adjusted to the same distance from the fulcrum or axis of the pivot block 38. With the parts of these relative proportions, a change of the gear 13 to a larger or smaller size will require an adjustment of one lever arm in respect to the other, to such an extent that the ratio of the effective lengths of the lever arms will correspond with the ratio of the gear diameters. It will of course be evident that the various friction disks may be made of different diameters, and this may be desirable in order to maintain the transmission ratio without wide variation in the lengths of the lever arms, where it is desired to test gears a great deal larger or a great deal smaller than the master gear. Although the lever arms are illustrated substantially in superposed and approximately parallel relationship, it will of course be evident that this is not essential, as they may be arranged at a considerable angle to each other.

The simple mechanism illustrated is free of any lost motion, and the parts are so designed and mounted that there is no liability of binding or jamming during adjustment of the parts.

Having thus described my invention, what I claim as new and desire to secure by Letters Patent is:

1. A gear testing apparatus including rotatable supports for a pair of meshing gears, indicating mechanism including coaxial members, and means for transmitting motion from said supports to said members, and including an adjustable part whereby the motion transmitting ratio may be varied.

2. A gear testing apparatus including rotatable supports for a pair of meshing gears indicating mechanism including coaxial rotatable parts, means for transmitting motion from one support to its corresponding part, and means for transmitting motion from the other support to the other part, one of said means being adapted for the adjustment of the motion transmitting ratio.

3. A gear testing apparatus including rotatable supports for a pair of meshing gears, indicating mechanism, means for transmitting motion from one of said supports to said indicating mechanism, and adjustable means for transmitting motion from the other support to said indicating mechanism and at varying rates, dependent upon the relative pitch diameters of the gears.

4. A gear testing apparatus including rotatable supports for a pair of meshing gears, indicating mechanism and means for transmitting motion from said supports to said indicating mechanism and including a lever having means for adjusting the power ratio according to the diameter of the gear wheels to be tested.

5. A gear testing apparatus including rotatable supports for a pair of meshing gears, indicating mechanism including a pair of coaxial rotatable members, and motion transmitting connections between said supports and said members and including a lever having means for adjusting the power ratio thereof in accordance with the diameters of said gears.

6. A gear testing apparatus including rotatable supports for a pair of meshing gears, indicating mechanism including a pair of coaxial rotatable parts, friction disks connected for rotation with said gears, friction disks connected for rotation with said parts, and separate means for transmitting motion from said first mentioned disks to said second mentioned disks, one of said means including a lever of adjustable power ratio, whereby said indicating member parts may be rotated at substantially the same speed from gears of different pitch ratio.

7. A gear testing apparatus including supports for a pair of meshing gears, indicating mechanism including a pair of rotatable parts, means for transmitting motion from one of said supports to one of said parts, and means for transmitting motion from the other of said supports to the other part, said last mentioned means including a two sectional longitudinally movable device and a double lever having the arms thereof engaging with the sections of said device.

8. A gear testing apparatus including supports for a pair of meshing gears, indicating mechanism including a pair of rotatable parts, means for transmitting motion from one of said supports to one of said parts, and means for transmitting motion from the other of said supports to the other part, said last mentioned means including a two-sectional longitudinally movable device, and a double lever having the arms thereof engaging with the sections of said device, the effective length of said lever arms being adjustable to vary the relative movements of said sections.

9. A gear testing apparatus including a support for a gear to be tested, a rotatable indicating member, said support and said member having friction disks rotatable therewith, a connecting device including a pair of rod sections, one having frictional engagement with one disk, and the other having frictional engagement with the other disk, and a lever having a pair of arms, one connected to one rod section, and the other connected to the other rod section.

10. A gear testing apparatus including a support for a gear to be tested, a rotatable indicating member, said support and said member having friction disks rotatable therewith, a connecting device including a pair of rod sections, one having frictional engagement with one disk, and the other having frictional engagement with the other disk, and a lever having a pair of arms, one connected to one rod section, and the other connected to the other rod section, the effective lengths of said lever arms being adjustable to vary the relative movements of said rod sections.

11. A gear testing apparatus including a support for a gear to be tested, a rotatable indicating member, said support and said member having friction disks rotatable therewith, a connecting device including a pair of rod sections, one having frictional engagement with one disk, and the other having frictional engagement with the other disk, and a lever having a pair of arms, one connected to one rod section, and the other connected to the other rod section, one of said lever arms being longitudinally adjustable in respect to its fulcrum to vary the power transmission ratio of said lever.

12. A gear testing apparatus having a pair of friction disks connected to the meshing gears, indicating mechanism including a pair of coaxial parts, friction disks connected to said parts, a rod having friction engagement with one of said first mentioned disks and with one of said second mentioned disks, and a second rod formed of two sections, one section engaging with the other of said first mentioned disks and the second section with the other of said second mentioned disks, and a lever, including a pair of superposed adjacent arms extending in a direction approximately at right angles to the direction of said rods, and having one arm connected to one of said sections, and the other connected to the other section, one of said lever arms being adjustable longitudinally in respect to its fulcrum whereby the adjustment of said lever arm may be made to compensate for substitution of gears of different diameter ratio.

13. A gear testing apparatus including a support for a master gear, a support for a gear to be tested in mesh therewith, one of said supports being adjustable in respect to the other to permit of the substitution of gears of different diameter, indicating mechanism, and means for operating said mechanism from said supports and including motion transmitting mechanism adjustable in accordance with the relative adjustment of said gear supports whereby different gear diameter ratios may be compensated for by corresponding differences in motion transmission to said indicating mechanism.

14. A gear testing apparatus including a rotatable support for a gear to be tested, a rotatable indicating member, a pair of rods, one moved endwise upon the rotation of said gear and the other acting when moved longitudinally, to rotate said indicating mechanism, a lever having a roller in transverse guided relationship to one of said rods, and a second roller in transverse guided relationship to the other rod, and means whereby the distance between one of said rollers and the lever fulcrum may be varied.

15. A gear testing apparatus including rotatable supports for a pair of meshing gears, indicating mechanism, means for transmitting motion from said supports to said indicating mechanism, and means for adjusting the motion transmitting ratio.

16. A gear testing apparatus including rotatable supports for a pair of meshing gears, indicating mechanism, and means for transmitting motion from each support to its corresponding part of said indicating mechanism, one of said means being adapted for the adjustment of the motion transmitting ratio.

Signed at St. Gallen, in the county of St. Gallen and State of Switzerland, this 14th day of July, A. D. 1921.

JEAN LAESSKER